US009937505B2

(12) United States Patent
Akdim et al.

(10) Patent No.: US 9,937,505 B2
(45) Date of Patent: Apr. 10, 2018

(54) CYCLONE SEPARATOR FOR HIGH GAS VOLUME FRACTION FLUIDS

(75) Inventors: Mohamed Reda Akdim, Nieuwegein (NL); Tarig Mukthar Abdalla, Amsterdam (NL)

(73) Assignee: FMC Separation Systems, BV, Amsterdam (NL)

( * ) Notice: Subject to any disclaimer, the term of this patent is extended or adjusted under 35 U.S.C. 154(b) by 632 days.

(21) Appl. No.: 13/501,866

(22) PCT Filed: Oct. 23, 2009

(86) PCT No.: PCT/IB2009/007754
§ 371 (c)(1),
(2), (4) Date: May 21, 2012

(87) PCT Pub. No.: WO2011/048439
PCT Pub. Date: Apr. 28, 2011

(65) Prior Publication Data
US 2012/0227585 A1  Sep. 13, 2012

(51) Int. Cl.
*B04C 5/13* (2006.01)
*B01D 17/02* (2006.01)
*B01D 19/00* (2006.01)

(52) U.S. Cl.
CPC ............ *B04C 5/13* (2013.01); *B01D 17/0217* (2013.01); *B01D 19/0057* (2013.01)

(58) Field of Classification Search
CPC .. B01D 19/0057; B01D 17/0217; B04C 3/06; B04C 5/13
See application file for complete search history.

(56) References Cited

U.S. PATENT DOCUMENTS 8,343,360 B2 * 1/2013 Schook ............... B04C 3/06
209/717
9,797,233 B2 * 10/2017 Chantrel ............. E21B 43/34
(Continued)

FOREIGN PATENT DOCUMENTS

CN  2282936 Y  *  6/1998  ............... B04C 5/26
DE  2 105 926     10/1971
(Continued)

OTHER PUBLICATIONS

Google machine translation of CN 2282936 Y.*

*Primary Examiner* — Amber R Orlando
*Assistant Examiner* — Stephen Hobson
(74) *Attorney, Agent, or Firm* — Henry C. Query, Jr.

(57) ABSTRACT

A cyclone separator for separating a heavy fraction from a multiphase fluid comprising a mixture of the heavy fraction, a medium fraction and a light fraction includes an elongated cyclone tube which comprises a fluid inlet, a heavy fraction outlet and a flow bore that extends between the fluid inlet and the heavy fraction outlet. A mandrel is positioned concentrically within the cyclone tube and comprises a light fraction outlet that extends generally axially therethrough and an outer diameter surface that together with the cyclone tube defines an annular flow path for the multiphase fluid which extends between the fluid inlet and the flow bore. The outer diameter surface comprises a generally cylindrical section which extends from proximate the fluid inlet to a convergence section which extends toward an outlet port that connects the light fraction outlet with the flow bore, and the mandrel further comprises a plurality of outlet holes which extend through the convergence section between the flow path and the light fraction outlet.

4 Claims, 4 Drawing Sheets

(56) References Cited

U.S. PATENT DOCUMENTS

| | | | |
|---|---|---|---|
| 2010/0006516 A1* | 1/2010 | Schook | B01D 19/0057 210/787 |
| 2010/0230367 A1* | 9/2010 | Nevedeev | B01D 17/0217 210/789 |
| 2017/0284182 A1* | 10/2017 | Hopper | B04C 5/15 |

FOREIGN PATENT DOCUMENTS

| | | | | |
|---|---|---|---|---|
| EP | 1180400 A1 * | 2/2002 | | B04C 3/00 |
| EP | 1180400 A1 * | 2/2002 | | B04C 3/00 |
| EP | 1 445 025 A1 | 8/2004 | | |
| EP | 1600215 A1 * | 11/2005 | | B01D 17/0217 |
| RU | 2 042 435 C1 | 8/1995 | | |
| WO | WO 9503868 A1 * | 2/1995 | | B01D 17/02 |
| WO | WO-9503868 A1 * | 2/1995 | | B01D 17/0217 |
| WO | WO-9603566 A2 * | 2/1996 | | E21B 7/14 |
| WO | WO 2007001174 A1 * | 1/2007 | | B01D 19/00 |
| WO | WO-2007001174 A1 * | 1/2007 | | B01D 19/0057 |
| WO | WO 2007/021181 A1 | 2/2007 | | |
| WO | WO2007021181 * | 2/2007 | | |
| WO | WO-2014025256 A1 * | 2/2014 | | B01D 19/0057 |

* cited by examiner

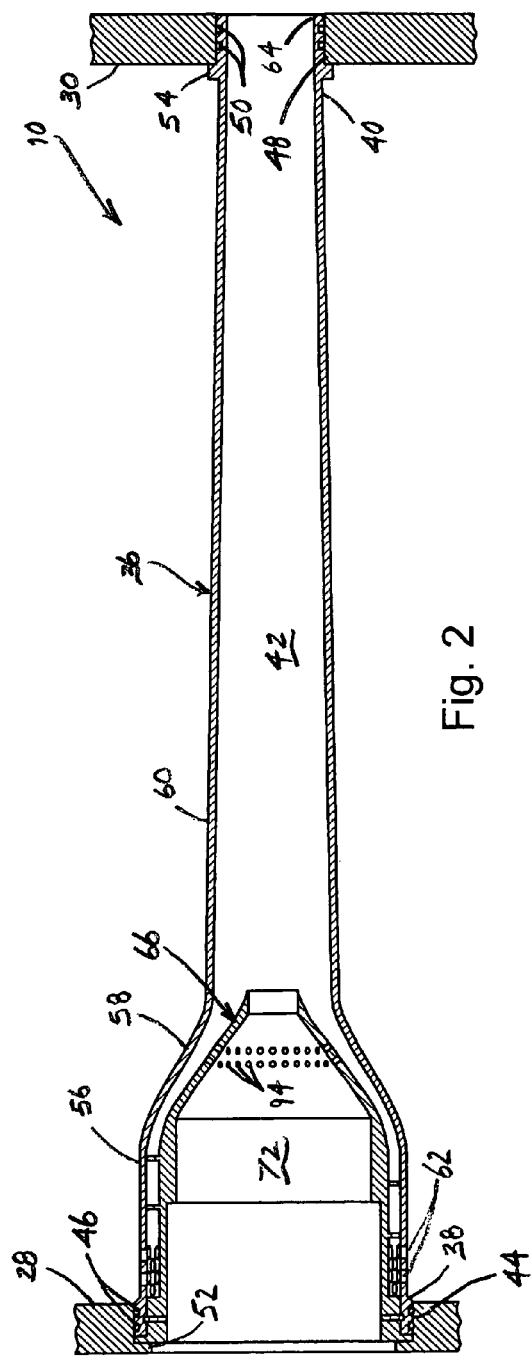
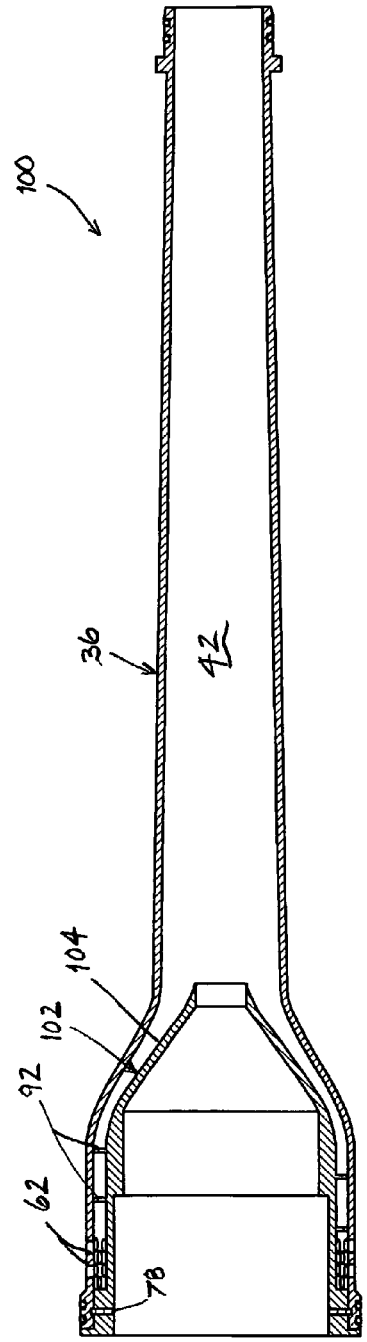
Fig. 2
Fig. 5 (prior art)

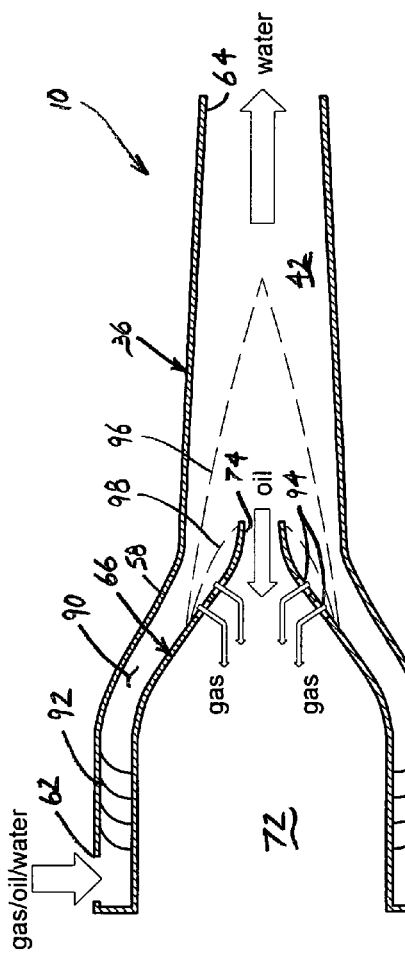
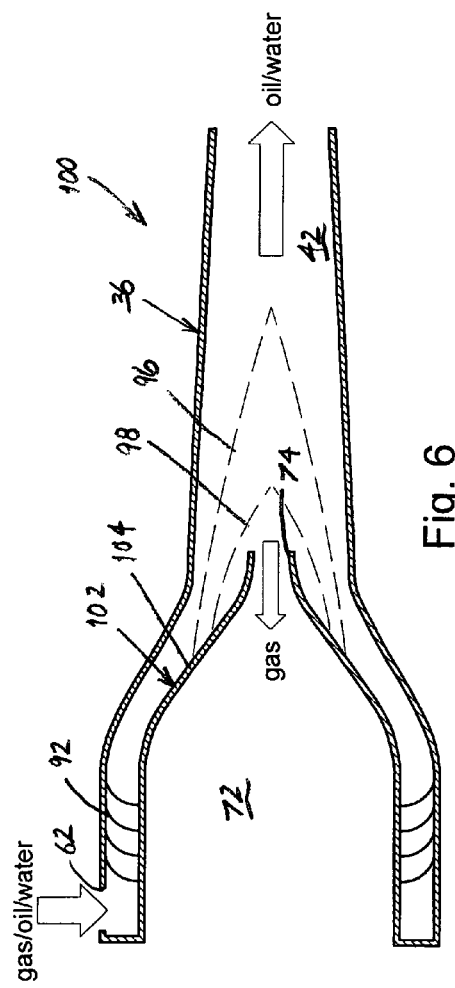
Fig. 4
Fig. 6 (prior art)

CYCLONE SEPARATOR FOR HIGH GAS VOLUME FRACTION FLUIDS

BACKGROUND OF THE INVENTION

The present invention relates to a cyclone separator for separating a multiphase fluid into its different fractions. In particular, the invention relates to a cyclone separator which is effective for separating a multiphase fluid comprising heavy, medium and light fractions into a heavy fraction and a mixture of light and medium fractions. In this manner, comparatively high heavy fraction/light fraction separation efficiencies may be achieved even when the fluid contains relatively large volumes of the light fraction.

Bulk de-oilers and hydrocyclones, which may be referred to generically as cyclone separators, are used in the hydrocarbon production industry to separate multiphase fluid streams into their different fractions so that these fractions may be treated separately. For example, cyclone separators are commonly used to separate the production fluid from a hydrocarbon well into separate streams of oil and water so that the oil can be conveyed to a processing facility and the water can be, e.g., re-injected into the well.

Prior art cyclone separators operate by rotating the production fluid to created centrifugal forces which cause the higher density water to move toward the outer portion of the fluid stream and the lighter density oil to move toward the middle of the fluid stream. The water is then discharged through a heavy fraction outlet and the oil is discharged through a separate light fraction outlet.

Although these prior art cyclone separators work relatively well when the production fluid contains relatively small amounts of gas, problems arise when the volume of gas in the production fluid is relatively large. This is due to the fact that the gas, being less dense than oil, is displaced toward the middle of the rotating production stream and consequently interferes with the discharge of the oil through the light fraction outlet. As a result, larger amounts of oils than desired are discharged through the heavy fraction outlet with the water.

SUMMARY OF THE INVENTION

In accordance with the present invention, these and other limitations in the prior art are addressed by providing a cyclone separator for separating a heavy fraction from a multiphase fluid comprising a mixture of the heavy fraction, a medium fraction and a light fraction. The cyclone separator includes an elongated cyclone tube which comprises a fluid inlet, a heavy fraction outlet and a flow bore that extends between the fluid inlet and the heavy fraction outlet. The cyclone separator also includes a mandrel which is positioned concentrically within the cyclone tube and comprises a light fraction outlet that extends generally axially therethrough and an outer diameter surface that together with the cyclone tube defines an annular flow path for the multiphase fluid which extends between the fluid inlet and the flow bore. The outer diameter surface comprises a generally cylindrical section which extends from proximate the fluid inlet to a convergence section which extends toward an outlet port that connects the light fraction outlet with the flow bore, and the mandrel further comprises a plurality of outlet holes which extend through the convergence section between the flow path and the light fraction outlet. In operation of the cyclone separator, the multiphase fluid flows through the fluid inlet and the flow path and is separated into the light fraction, the medium fraction and the heavy fraction, and the light fraction flows through the outlet holes and is discharged through the light fraction outlet, the medium fractions flows through the outlet port and is discharged through the light fraction outlet, and the heavy fraction flows through the flow bore and is discharged through the heavy fraction outlet.

The present invention also provides a method for separating a heavy fraction from a multiphase fluid comprising a mixture of the heavy fraction, a medium fraction and a light fraction. The method comprises introducing the multiphase fluid into a cyclone separator comprising an axially extending flow bore; rotating the multiphase fluid to cause it to separate into the heavy fraction, the medium fraction and the light fraction; discharging the heavy fraction through a heavy fraction outlet which is connected to the flow bore; discharging the medium fraction through an outlet port which is connected to the flow bore; and discharging the light fraction through a number of outlet holes which are connected to the flow bore upstream of the outlet port. In this regard, the light and medium fractions may be discharged through a light fraction outlet which is connected to the outlet port and the outlet holes.

The present invention further provides a method for retrofitting an existing cyclone separator comprising a cyclone tube and a mandrel which is positioned concentrically within the cyclone tube. The cyclone tube includes a fluid inlet which is connected to an axial flow bore, and the mandrel includes a light fraction outlet and a substantially solid outer surface which extends from proximate the fluid inlet toward an outlet port that connects the flow bore to the light fraction outlet. The method of retrofitting this existing cyclone separator comprises removing the mandrel from the cyclone tube; and replacing the mandrel with a modified mandrel which comprises a light fraction outlet, a substantially solid outer surface which extends from proximate the fluid inlet toward an outlet port that connects the flow bore to the light fraction outlet, and a number of outlet holes which connect the flow bore to the light fraction outlet between the outlet port and the fluid inlet.

Thus, the cyclone separator of the present invention provides a simple but effective means for separating the heavy fraction from the medium fraction even in the presence of large volumes of the light fraction. The invention operates to first remove a substantial portion of the light fraction before the medium fraction is removed from the heavy fraction. Consequently, the light fraction will not interfere with the discharge of the medium fraction through the light fraction outlet. As a result, the cyclone separator can achieve relatively high heavy fraction/medium fraction separation efficiencies with fluid mixtures comprising relatively large volumes of the light fraction.

These and other objects and advantages of the present invention will be made apparent from the following detailed description, with reference to the accompanying drawings. In the drawings, the same reference numbers may be used to denote similar components in the various embodiments.

BRIEF DESCRIPTION OF THE DRAWINGS

FIG. 2 is a longitudinal cross sectional view of the cyclone separator of FIG. 1;

FIG. 4 is a representation showing how the gas, oil and water fractions are separated in the cyclone separator of the present invention;

FIG. 5 is a longitudinal cross sectional view of a prior art cyclone separator; and FIG. 6 is a representation showing how the gas, oil and water fractions are separated in the prior art cyclone separator.

DETAILED DESCRIPTION OF THE INVENTION

The present invention is directed to a cyclone separator for separating a multiphase fluid into its separate fractions. In the hydrocarbon production industry, for example, the multiphase fluid may comprise the production fluid from a hydrocarbon well. Depending on the well, the production fluid may comprise a heavy fraction such as water, a medium fraction such as oil and a light fraction such as gas. In such situations, a common objective is to separate the water from the oil and gas so that the water may be, e.g., re-injected into the well.

The cyclone separator of the present invention operates to first remove a substantial portion of the gas from the fluid stream and then separate the water from the oil. As a result, the cyclone separator can achieve relatively high oil/water separation efficiencies with fluid mixtures comprising relatively large volumes of the gas fraction. Although the invention is particularly useful for hydrocarbon production applications in which the produced fluid comprises a mixture of water, oil and gas, the invention is not limited to such applications.

Figure 1:
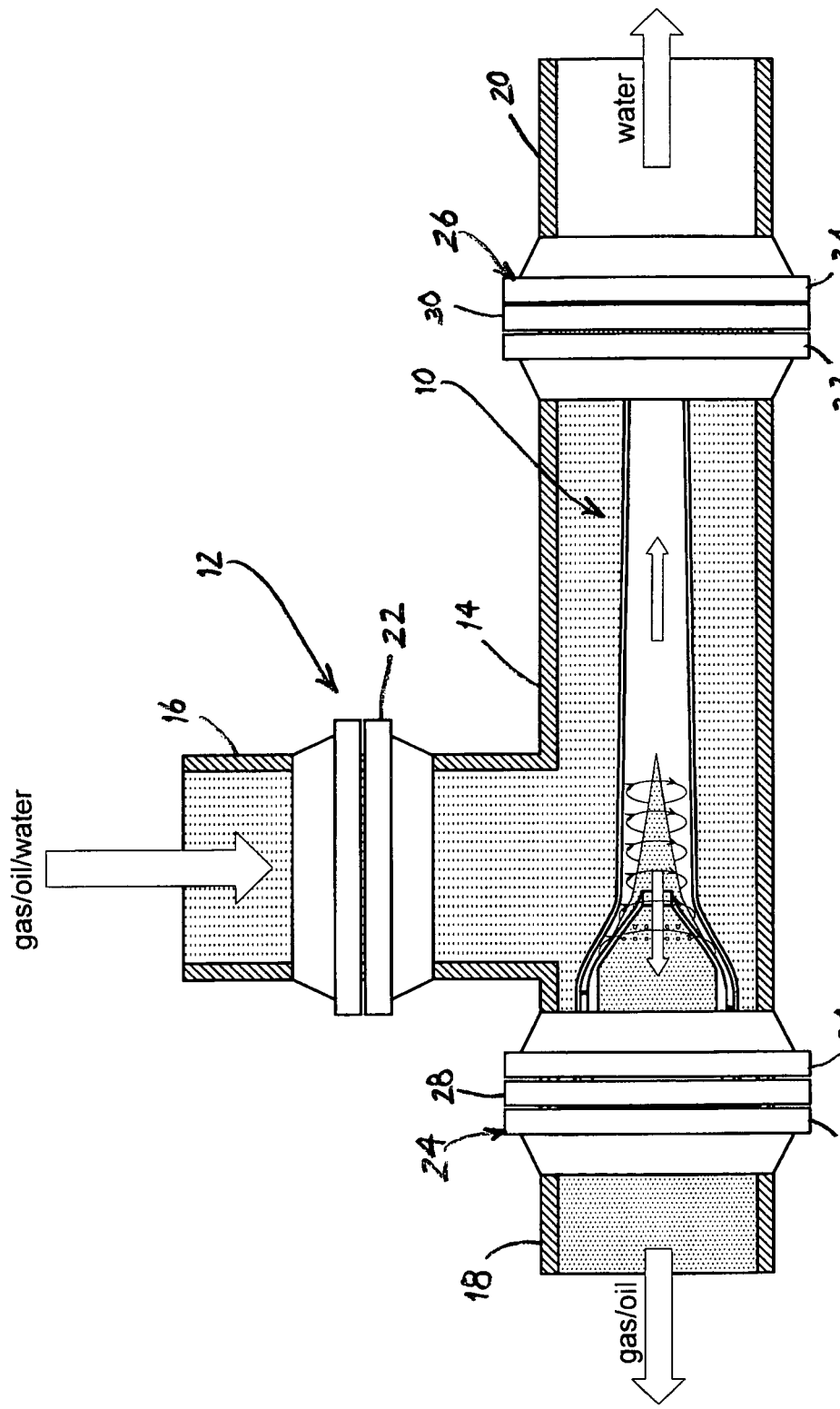
FIG. 1 is a cross sectional representation of the cyclone separator of the present invention shown installed in an exemplary pipe assembly.

Referring to FIG. 1, one embodiment of the cyclone separator of the present invention, which is indicated generally by reference number 10, is shown mounted in an exemplary pipe assembly 12. The pipe assembly 12 includes a generally T-shaped fitting 14 which is connected between an inlet pipe 16, a light fraction discharge pipe 18 and a heavy fraction discharge pipe 20. The inlet pipe 16 is connected to the T-fitting 14 with, e.g., a conventional flange connection 22, and each discharge pipe 18, 20 is connected to the T-fitting with a respective modified flange connection 24, 26. Each modified flange connection 24, 26 includes a corresponding mounting flange 28, 30 which is connected between a pair of conventional pipe flanges 32, 34, and each end of the cyclone separator 10 is mounted in a corresponding mounting flange to thereby secure the cyclone separator within the pipe assembly 12.

Referring also to FIG. 2, the cyclone separator 10 includes an elongated cyclone tube 36 which comprises an inlet end 38, an outlet end 40 and a flow bore 42 which extends axially between the inlet and outlet ends. The inlet end 38 is received in a cylindrical recess 44 in the mounting flange 28 and is sealed thereto by a number of suitable seals 46. The outlet end 40 is received in a cylindrical aperture 48 in the mounting flange 30 and is sealed thereto by a number of similar seals 50. The inlet end 38 abuts a radially inner lip 52 which is formed at the base of the recess 44, and the outlet end 40 includes an annular shoulder 54 which abuts the mounting flange 30 adjacent the aperture 48. Thus, when the mounting flanges 28, 30 are connected between their corresponding pipe flanges 32, 34, the cyclone tube 36 is trapped between the mounting flanges and thereby firmly secured within the pipe assembly 12.

In the embodiment of the invention shown in FIG. 2, the cyclone tube 36 comprises an enlarged diameter portion 56 adjoining the inlet end 38 which is connected via a converging transition portion 58 to a reduced diameter portion 60 extending to the outlet end 40. A plurality of radial holes 62 in the enlarged diameter portion 56 between the inlet end 38 and the transition portion 58 define a fluid inlet which connects the inlet pipe 16 with the flow bore 42. An axial opening 64 in the outlet end 40 defines a heavy fraction outlet which connects the flow bore 42 with the heavy fraction discharge pipe 20.

Figure 3:
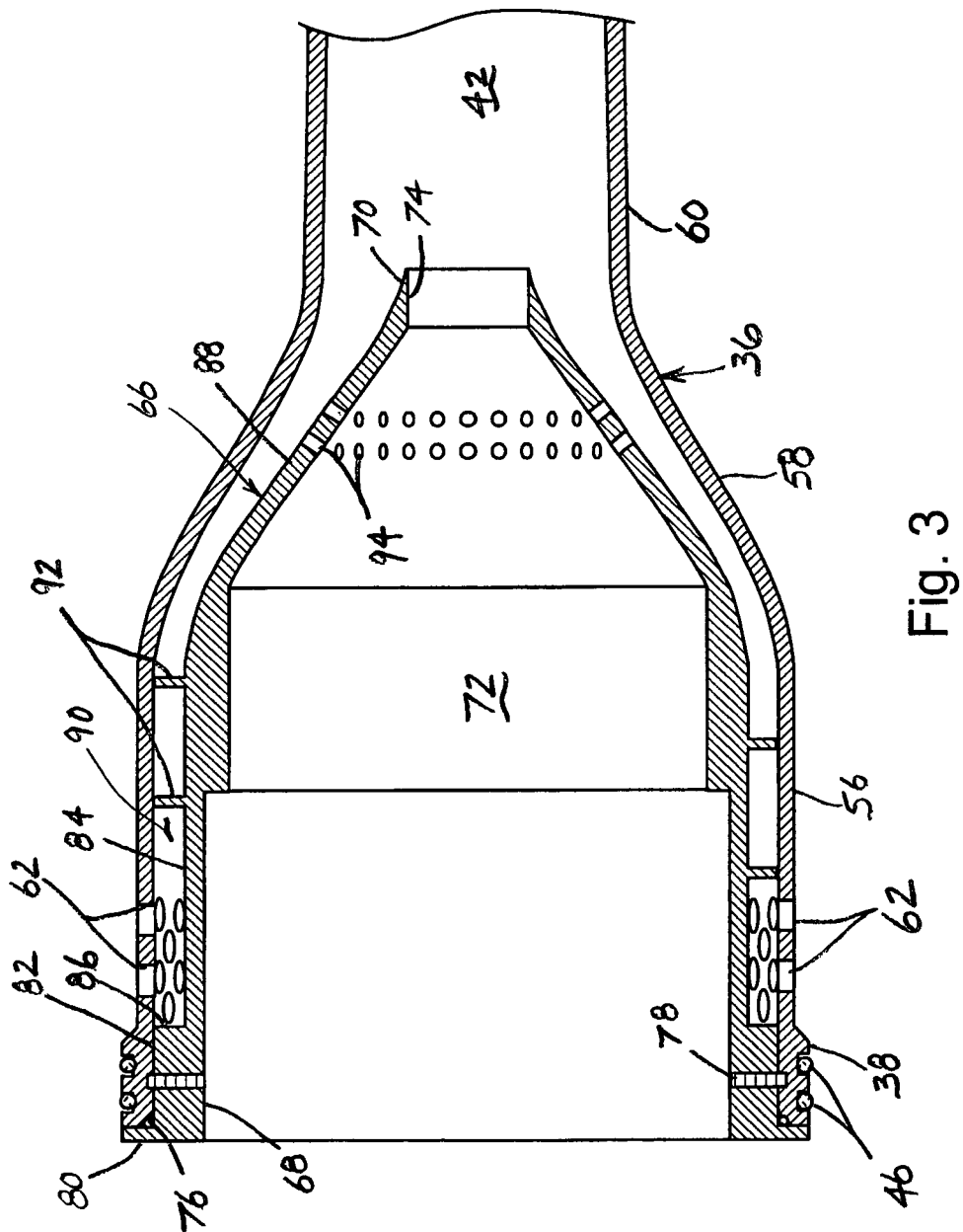
FIG. 3 is an enlarged cross sectional view of the left hand portion of the cyclone separator shown in FIG. 2.

Referring also to FIG. 3, the cyclone separator 10 further includes a generally tubular mandrel 66 which is positioned concentrically within the enlarged diameter portion 56 of the cyclone tube 36. The mandrel 66 comprises a first end 68, a second end 70 and an annular channel 72 which extends between the first and second ends and defines a light fraction outlet that is connected to the flow bore 42 via a discharge port 74. The first end 68 of the mandrel 66 is received within the inlet end 38 of the cyclone tube 36 and is sealed thereto by an appropriate seal 76. The mandrel 66 is secured to the cyclone tube 36 by suitable means, such as a number of set screws 78, and the first end 68 of the mandrel may comprise an annular lip 80 which engages the end of the cyclone tube to thereby further retain the mandrel in place.

The first end 68 of the mandrel 66 comprises an outer diameter surface 82 which forms a sliding fit with the enlarged diameter portion 56 of the cyclone tube 36. The outer diameter surface 82 is connected to a reduced diameter, generally cylindrical section 84 of the mandrel 66 by a radial shoulder 86 which, when the mandrel is positioned in the cyclone tube 36, is located between the inlet end 38 of the cyclone tube and the inlet holes 62. The cylindrical section 84 is in turn connected to an annular convergence section 88 which extends to the second end 70 of the mandrel 66 and is positioned generally within the transition portion 58 of the cyclone tube 36.

The cyclone tube 36 and the outer surface of the mandrel 66 form an annular flow path 90 which extends axially from the inlet holes 62 along the cylindrical section 84 of the mandrel and then converges toward the flow bore 42. The cyclone separator 10 also includes a conventional static swirl element 92 which is positioned concentrically between the cyclone tube 36 and the mandrel 66. The swirl element 92, which may be connected to or formed integrally with the mandrel 66, causes the fluid to rotate as it flows through the flow path 90 from the inlet holes 62 to the flow bore 42.

In accordance with the present invention, the mandrel 66 also includes plurality of discharge holes 94 extending through the convergence section 88 between the flow path 90 and the light fraction outlet 72. The purpose of the discharge holes 94 will be made apparent below.

The operation of the cyclone separator 10 will now be described with reference to FIGS. 1 and 4. In operation, a multiphase fluid stream comprising a heavy fraction such as water, a medium fraction such as oil and a light fraction such as gas is conveyed through the inlet pipe 16 and the T-fitting 14 to the cyclone separator 10. The fluid stream enters the cyclone separator 10 through the inlet holes 62 and is set into rotation by the swirl element 92 as it travels through the flow path 90.

As the rotating fluid travels through the converging transition portion 58 of the cyclone tube 36, the centrifugal forces acting on the fluid will increase and cause the fluid to separate into its different fractions. The heavy fraction, being the most dense, will move toward the inner surface of the cyclone tube 36, the medium fraction, being less dense than the heavy fraction but more dense than the light fraction, will be displaced toward the middle of the cyclone tube, and the light fraction, being less dense than the medium fraction, will be displaced toward the outer surface of the mandrel 66.

The highly idealized boundaries between the heavy fraction and the medium fraction and between the medium fraction and the light fraction are represented in FIG. 4 by the dashed lines 96 and 98, respectively. In reality, however, the boundaries between these different fractions will be less defined. The portion of the flow bore 42 in which the heavy fraction is concentrated is connected to the heavy fraction outlet 64 in the cyclone tube 36, the portion of the flow bore in which the medium fraction is concentrated is connected to the discharge port 74 in the mandrel 66, and the portion of the flow bore in which the light fraction is concentrated is connected to the discharge holes 94 in the mandrel.

Thus, the heavy fraction will continue through the cyclone tube 36 and be discharged through the heavy fraction outlet 64 while the medium and light fractions will flow through the discharge port 74 and the discharge holes, respectively, and be discharged together through the light fraction outlet 72. However, prior to the fluid entering the portion of the flow bore 42 located downstream of the mandrel 66, a substantial portion of the light fraction will escape through the discharge holes 94 and into the light fraction outlet 72. As a result, the light fraction will not interfere with the flow of the medium fraction into the discharge port 74. Consequently, a substantial portion of the medium fraction will be separated from the heavy fraction prior to the heavy fraction being discharged through the heavy fraction outlet 64.

For purposes of comparison with the cyclone separator 10 of the present invention, a prior art cyclone separator is shown in FIG. 5. This prior art cyclone separator, which is indicated generally by reference number 100, is very similar to the cyclone separator 10. However, in contrast to the cyclone separator 10, the cyclone separator 100 includes a mandrel 102 having a solid convergence section 104. In other words, the mandrel 102 does not include the discharge holes 94 which are present in the mandrel 66 of the cyclone separator 10.

The operation of the prior art cyclone separator 100 is shown in FIG. 6. As with the cyclone separator 10 of the present invention, the multiphase fluid enters the cyclone separator 100 through the inlet 62 and is set into rotation by the swirl element 92. This causes the fluid to separate into its different fractions, with the heavy fraction moving toward the inner surface of the cyclone tube 36, the medium fraction being displaced toward the middle of the cyclone tube, and the light fraction being displaced toward the outer surface of the mandrel 102. However, since the convergence section 104 of the mandrel 102 does not comprise any discharge holes 94 through which the light fraction may be withdrawn from the flow bore 42, the light fraction will move toward the middle of the flow bore and block the medium fraction from entering the discharge port 74. As a result, a large portion of the medium fraction will be discharged through the heavy fraction outlet 64 with the heavy fraction. This results in a relatively low heavy fraction/light fraction separation efficiency.

Thus, the provision of the discharge holes 94 in the cyclone separator 10 of the present invention allows the light fraction to escape into the light fraction outlet 72 before reaching the end of the mandrel 66. This prevents the light fraction from blocking the flow of the medium fraction into the discharge port 74. As a result, a large portion of the medium fraction will be removed from the fluid and discharged through the light fraction outlet 72 instead of through the heavy fraction outlet 64. Consequently, the heavy fraction discharged through the heavy fraction outlet 64 will contain only a relatively small portion of the medium fraction. This results in a high heavy fraction/light fraction separation efficiency.

Although the prior art cyclone separator 100 is effective for separating the heavy and light fractions when the multiphase fluid contains relatively small volumes of light fraction, it has been shown that this separator cannot practicably separate the heavy and light fractions when the multiphase fluid contains relatively large volumes of light fraction. However, since the prior art cyclone separator 100 is similar in most respects to the cyclone separator 10, a benefit may be had if the prior art cyclone separator could be altered to function in a manner similar to the cyclone separator of the present invention.

This objective may be achieved by retrofitting the prior art cyclone separator 100 with the mandrel 66 of the cyclone separator 10. In order to do this, the mandrel 102 is removed from the cyclone tube 36 after first retracting the set screws 78, and then a new mandrel 66 is installed in the cyclone tube and secured thereto with its own set screws. The resulting cyclone separator will be similar to and function like the cyclone separator 10 of the present invention.

Variations of the cyclone separator 10 may be readily derived by the person of ordinary skill in the art from the above teachings and should therefore be considered to fall within the scope of the present invention. For example, the mandrel of the present invention may be used in cyclone separators which use tangential fluid inlets to rotate the fluid rather than or in addition to a static swirl element. Also, rather than entering the cyclone separator radially through the inlet holes 62, the multiphase fluid could be conveyed axially into the cyclone separator, for example through suitable ports in the inlet end 38 of the cyclone tube 36 and/or the first end 68 of the mandrel 66. Also, the heavy fraction outlet 64 and/or the light fraction outlet 72 may be connected to respective conduits which extend transversely through the cyclone separator to corresponding discharge pipes. Additionally, instead of being discharged in a reverse flow fashion through the light fraction outlet 72, the medium fraction may be discharged in a forward flow manner through a medium fraction outlet which is positioned concentrically in the cyclone tube 36 downstream of the mandrel 66.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A cyclone separator for separating a heavy fraction from a multiphase fluid comprising a mixture of the heavy fraction, a medium fraction and a light fraction, the cyclone separator including:

an elongated cyclone tube which comprises a fluid inlet, a heavy fraction outlet and a flow bore that extends between the fluid inlet and the heavy fraction outlet;

a tubular mandrel which is positioned concentrically within the cyclone tube, the mandrel comprising a central axis, a first end which is located proximate the fluid inlet, a second end which is located between the first end and the heavy fraction outlet, a light fraction outlet that extends generally axially through the mandrel, an outer diameter surface that together with the cyclone tube defines an annular flow path for the multiphase fluid which extends between the fluid inlet and the flow bore, and a discharge port that extends along the central axis through the second end of the mandrel and connects the light fraction outlet with the flow bore;

the outer diameter surface comprising a generally cylindrical section which extends from proximate the fluid inlet toward the second end, and a convergence section which extends between the cylindrical section and the discharge port;

the mandrel further comprising a plurality of discharge holes which extend through the convergence section between the flow path and the light fraction outlet;

wherein in operation of the cyclone separator, the multiphase fluid flows through the fluid inlet and the flow path and is separated into the light fraction, the medium fraction and the heavy fraction, and wherein the light fraction flows through the discharge holes and is discharged through the light fraction outlet, the medium fractions flows through the discharge port and is discharged through the light fraction outlet, and the heavy fraction flows through the flow bore and is discharged through the heavy fraction outlet.

2. A method for separating a heavy fraction from a multiphase fluid comprising a mixture of the heavy fraction, a medium fraction and a light fraction, the method comprising:

providing a cyclone separator which includes an elongated cyclone tube having a fluid inlet, a heavy fraction outlet and a flow bore that extends generally axially from the fluid inlet to the heavy fraction outlet;

positioning a tubular mandrel concentrically within the flow bore, the mandrel comprising a central axis, a first end which is located proximate the fluid inlet, a second end which is located between the first end and the heavy fraction outlet, a discharge port which extends along the central axis through the second end, a cylindrical section which extends from proximate the fluid inlet toward the second end, and a convergence section which extends between the cylindrical section and the discharge port;

introducing the multiphase fluid into the flow bore through the fluid inlet;

rotating the multiphase fluid to cause it to separate into the heavy fraction, the medium fraction and the light fraction;

discharging the heavy fraction through the heavy fraction outlet;

discharging the medium fraction through the discharge port; and discharging the light fraction through a number of discharge holes which extend through the convergence section of the mandrel.

3. The method of claim 2, wherein the light and medium fractions are discharged through a light fraction outlet which extends through the mandrel and is connected to both the discharge port and the discharge holes.

4. A method for retrofitting an existing cyclone separator comprising a cyclone tube and a tubular mandrel which is positioned concentrically within the cyclone tube, the cyclone tube including a fluid inlet, a heavy fraction outlet and an axial flow bore extending between the fluid inlet and the heavy fraction outlet, and the mandrel including a light fraction outlet and a substantially solid outer surface which extends from proximate the fluid inlet toward an outlet port that connects the flow bore to the light fraction outlet, the method comprising:

removing the mandrel from the cyclone tube; and replacing the mandrel with a modified tubular mandrel which comprises a light fraction outlet that extends axially therethrough, central axis, a first end located proximate the fluid inlet, a second end located between the first end and the heavy fraction outlet, a substantially solid outer surface which extends from proximate the first end to the second end, a discharge port that extends along the central axis through the second end of the mandrel and connects the flow bore to the light fraction outlet, and a number of discharge holes which connect the flow bore to the light fraction outlet between the discharge port and the fluid inlet;

wherein the outer surface of the modified mandrel comprises a cylindrical section extending from adjacent the first end and a convergence section extending between the cylindrical section and the discharge port; and wherein the discharge holes are located in the convergence section upstream of the discharge port.

* * * * *